United States Patent
Martin (10) Patent No.: US 9,188,505 B2
(45) Date of Patent: Nov. 17, 2015

(54) METHOD AND SYSTEM FOR CYLINDER COMPRESSION DIAGNOSTICS

(71) Applicant: Ford Global Technologies, LLC, Dearborn, MI (US)

(72) Inventor: Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 103 days.

(21) Appl. No.: 13/924,309

(22) Filed: Jun. 21, 2013

(65) Prior Publication Data

US 2014/0379206 A1 Dec. 25, 2014

(51) Int. Cl.
| | |
|---|---|
| *G01M 17/00* | (2006.01) |
| *G06F 7/00* | (2006.01) |
| *G06F 19/00* | (2011.01) |
| *G01M 15/05* | (2006.01) |
| *G01M 15/02* | (2006.01) |
| *F02D 41/04* | (2006.01) |
| *F02D 41/22* | (2006.01) |
| *F02N 11/00* | (2006.01) |
| *F02D 41/00* | (2006.01) |

(52) U.S. Cl.
CPC .............. *G01M 15/05* (2013.01); *F02D 41/042* (2013.01); *F02D 41/22* (2013.01); *G01M 15/02* (2013.01); *F02D 2041/001* (2013.01); *F02N 11/003* (2013.01); *F02N 2200/062* (2013.01); *Y10S 903/93* (2013.01)

(58) Field of Classification Search
CPC .............. G01M 15/042; Y10S 903/905; Y10S 903/93; B60W 20/50; B60W 10/06; B60W 10/08

USPC ................... 701/22, 102; 180/65.28; 903/930
See application file for complete search history.

(56) References Cited

U.S. PATENT DOCUMENTS

| | | | | | |
|---|---|---|---|---|---|
| 3,765,233 | A | * | 10/1973 | Germann | 73/114.23 |
| 3,839,906 | A | * | 10/1974 | Hanson | 73/114.23 |
| 4,027,532 | A | * | 6/1977 | Trussell et al. | 73/114.23 |
| 4,062,232 | A | * | 12/1977 | Sutphin, Jr. | 73/114.23 |
| 4,539,841 | A | | 9/1985 | Schroeder et al. | |
| 4,809,540 | A | * | 3/1989 | Lackner et al. | 73/114.23 |
| 5,663,493 | A | * | 9/1997 | Gerbert et al. | 73/114.23 |
| 5,924,395 | A | * | 7/1999 | Moriya et al. | 123/90.15 |
| 6,131,538 | A | * | 10/2000 | Kanai | 123/2 |
| 6,253,866 | B1 | * | 7/2001 | Kojima | 180/65.235 |
| 6,276,334 | B1 | * | 8/2001 | Flynn et al. | 123/435 |
| 6,295,973 | B1 | * | 10/2001 | Yang | 123/543 |
| 6,553,816 | B1 | * | 4/2003 | Palanisamy et al. | 73/114.59 |

(Continued)

OTHER PUBLICATIONS

"How to Perform a Compression Test," Greg's Engine and Machine, http://www.gregsengine.com/cylinder-compression-testing.html, 2012, Accessed Oct. 30, 2013.

*Primary Examiner* — Bhavesh V Amin
(74) *Attorney, Agent, or Firm* — David Kelley; Alleman Hall McCoy Russell & Tuttle LLP (57) ABSTRACT

Methods and systems are provided for performing a non-intrusive engine compression test. When compression testing is requested, a hybrid vehicle engine may be spun unfueled using energy from a battery driven electric motor. Changes in battery current over multiple engine cycles is used to infer cylinder compression parameters and assess cylinder compression degradation.

16 Claims, 4 Drawing Sheets

(56) References Cited

U.S. PATENT DOCUMENTS

| | | | |
|---|---|---|---|
| 6,947,830 B1* | 9/2005 | Froloff et al. | 701/111 |
| 7,159,561 B1* | 1/2007 | Kerns et al. | 123/319 |
| 7,167,789 B1* | 1/2007 | Froloff et al. | 701/101 |
| 7,913,546 B2* | 3/2011 | Vinci et al. | 73/114.23 |
| 2002/0007668 A1* | 1/2002 | Maruta et al. | 73/116 |
| 2006/0217228 A1* | 9/2006 | Devita et al. | 477/3 |
| 2014/0316621 A1* | 10/2014 | Martin et al. | 701/22 |
| 2014/0316622 A1* | 10/2014 | Martin et al. | 701/22 |

* cited by examiner

METHOD AND SYSTEM FOR CYLINDER COMPRESSION DIAGNOSTICS

FIELD

The present application relates to methods and systems for performing a non-intrusive engine compression test on a hybrid vehicle system.

BACKGROUND AND SUMMARY

Internal combustion engines need to have adequate compression levels within each cylinder in order to operate properly. Accordingly, compression tests may be routinely performed to diagnose the compression level in each cylinder. Inadequate cylinder compression may be used to diagnose cylinder components such as valves, gaskets, rings, etc. Typically, compression tests may be intrusive requiring the disassembly of the engine. For example, spark plugs and/or fuel injectors may be removed from the engine by a service technician so that a pressure transducer can be inserted to measure individual cylinder pressure levels. Furthermore, the engine may need to be rotated unfueled (e.g., via a starter motor) to a desired position in the engine cycle. However, such intrusive approaches tend to be difficult and time consuming, and also require a trained technician. Further still, the removal of engine components (e.g., spark plugs) to perform the test renders the removed components prone to damage.

One example approach for performing a non-intrusive compression test is shown by Schroeder et al in U.S. Pat. No. 4,539,841. Therein, a probe in the form of an electromagnetic speed sensor is used to measure instantaneous engine speed over the compression phase of each cylinder during engine idle conditions. The estimated engine speed is used to infer cylinder peak pressure and peak power outputs. By comparing the inferred values to a normalized pressure curve, cylinder compression issues are diagnosed. Another example non-intrusive compression test is shown by Gerbert et al in U.S. Pat. No. 5,663,493. Therein, a service tool is used to monitor the battery voltage or current in an engine during the cranking phase where the engine is rotated using a starter motor which draws current from the battery. The tool displays the relative compression of each cylinder on a screen to the technician based on the variation in starter current.

The inventors herein have recognized potential issues with such approaches. As one example, while the approaches are non-intrusive, they nonetheless require a technician for completion. Specifically, both approaches require the use of diagnostic tools that have to be attached to specific locations of the engine or vehicle by a trained technician. In the approach of '841, the use of an idling engine may also add substantial noise factors that can corrupt the diagnostic results. In the approach of '493, the method is limited to assessing changes in battery current at engine cranking speeds. As such, more significant current changes may be available at other higher engine speeds. In addition, the limited air flow at the cranking speed can add substantial noise factors. In either case, the diagnostics may be time consuming and the results may be error prone (e.g., prone to human errors or noise-induced errors).

In one example, some of the above issues may be at least partly addressed by a method for a hybrid vehicle system comprising: spinning an engine unfueled using motor torque with intake valve timing advanced and an intake throttle open; and based on a change in battery current during the spinning, indicating cylinder compression degradation. In this way, a compression test can be performed automatically and non-intrusively without requiring a trained technician to disassemble engine parts or use complex diagnostic tools.

For example, while a hybrid electric vehicle system is in a key-off condition, a cylinder compression test request may be received at the vehicle from a service technician or operator. The request may be made via interactions with a touch-interactive display of the vehicle, or via a simple diagnostic tool. In response to the compression test request, the controller may confirm that the engine temperature is within a defined range (e.g., above 60° F.). Upon confirmation, the engine may be spun unfueled using motor torque from a battery-driven electric motor/generator used to propel the vehicle. The engine may be initially spun at a lower speed (e.g., 1000 rpm) for a shorter duration (e.g., 15 seconds) to reduce friction variability in cylinders from lack of oil film and to build sufficient pressure at an engine-driven mechanical oil pump to help actuate engine cams. The engine may then be spun at a higher speed (e.g., 1000 rpm-2000 rpm or more) for a longer duration with intake valve timing fully advanced (via intake cam timing advance) and with an intake throttle fully open. The engine speed may be adjusted to be the lowest achievable engine speed that allows engine speed control to be retained while driving manifold pressure (MAP) towards barometric pressure (BP). By opening the throttle and advancing the intake cam, more air may be ingested in the engine cylinders enabling higher peak pressures to be attained. As such, this significantly improves the signal-to-noise ratio.

A change in the battery current (or voltage) is then monitored over one or more engine cycles, specifically, during the compression stroke of each cylinder. Since the battery has internal resistance, the voltage across the battery terminals varies as a function of engine spinning resistance, which varies according to the compression in each cylinder. The change in current is used to estimate the torque produced in each cylinder's compression stroke. The estimated torque is then used to infer each cylinder's compression pressure using scalar algorithms. By comparing the inferred compression pressure of each cylinder with an expected cylinder compression pressure, degradation of cylinder compression can be identified and a diagnostic code can be set identifying the specific cylinder(s) that failed the test. A service technician can then diagnose the affected cylinder.

In this way, a cylinder compression test can be performed non-intrusively without requiring engine disassembly. By enabling the test to run automatically following a test request by a service technician, substantial time and cost reduction benefits are achieved. In addition, damage to spark plugs threads and other engine components may be reduced. By inferring the cylinder pressure based on the change in battery current, the need for dedicated cylinder pressure transducers is reduced. Overall, a simple yet accurate non-intrusive compression test is provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
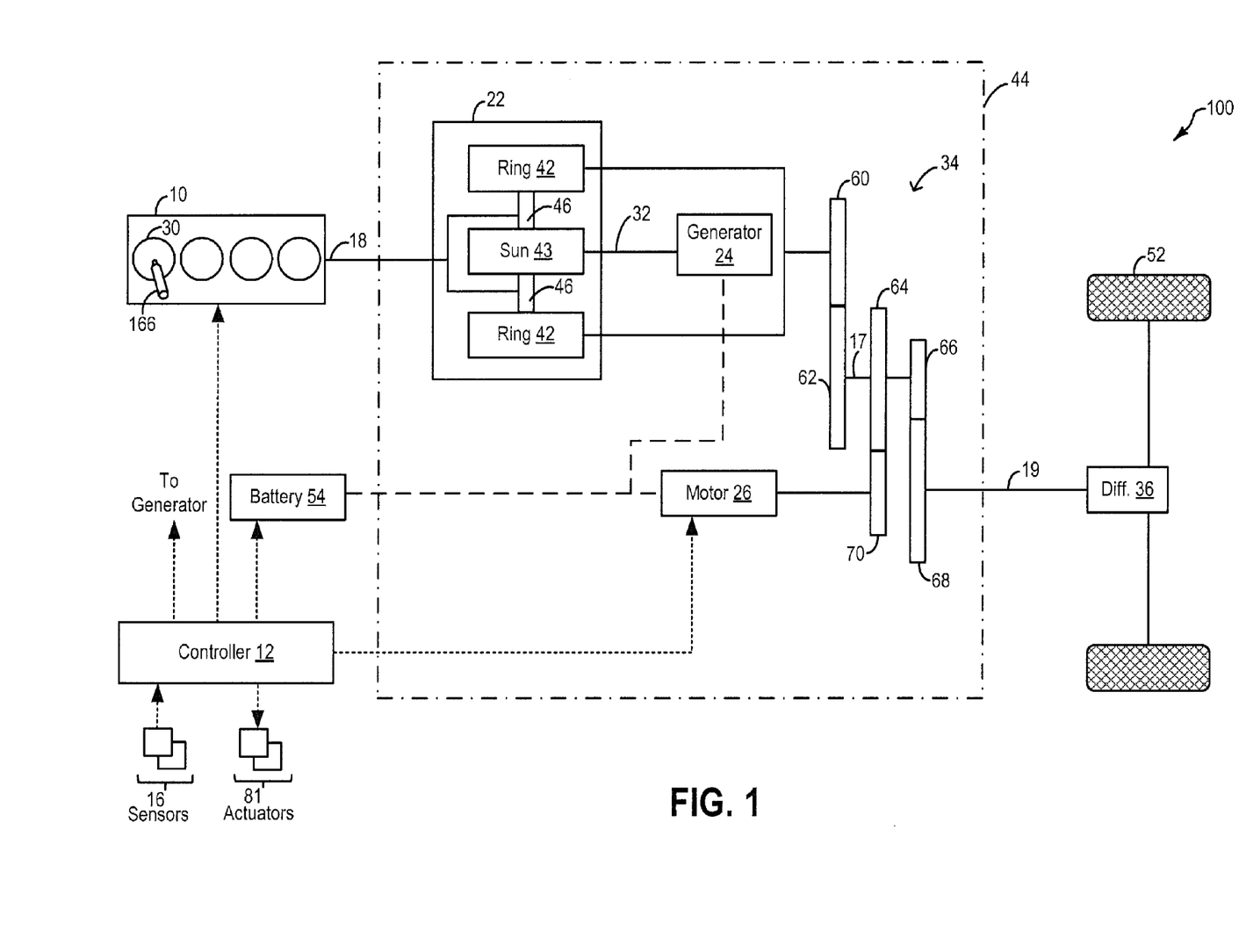
FIG. 1 illustrates an example propulsion system for a hybrid electric vehicle.
Figure 2:
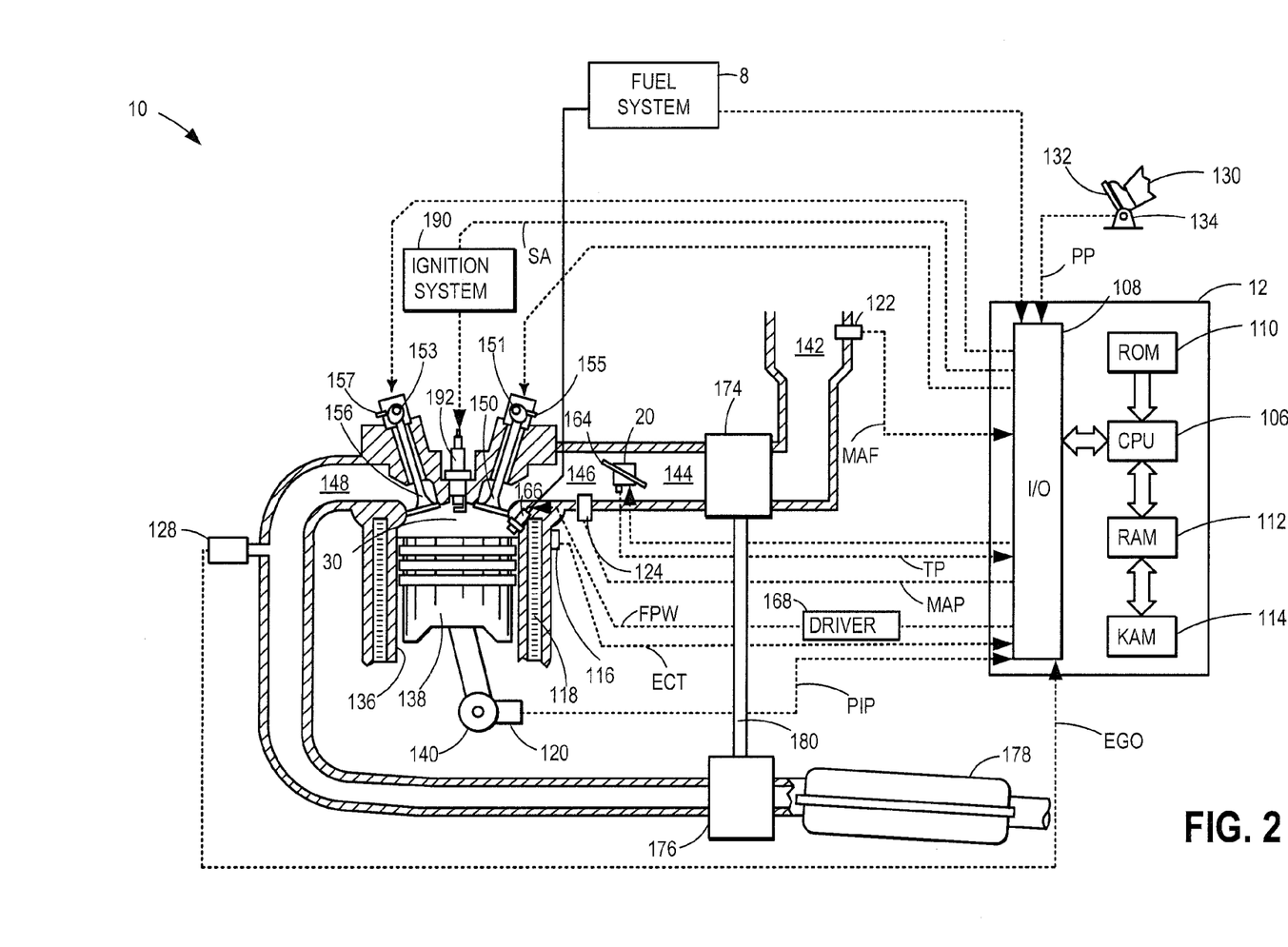
FIG. 2 illustrates an example internal combustion engine.

The following description relates to systems and methods for performing engine compression diagnostics in a hybrid vehicle, such as the hybrid electric vehicle (HEV) system of FIGS. 1-2. A vehicle controller may be configured to perform a control routine, such as the routine of FIG. 3, in response to a request for compression testing, to spin the engine unfueled using power from a battery-driven vehicle system motor. Changes in battery current during the spinning may be used to infer corresponding changes in cylinder compression torque and compression pressure. By comparing the estimated compression pressure of a cylinder with an expected compression pressure, degradation of cylinder compression can be accurately identified. An example compression test is shown at FIG. 4. In this way, engine compression can be diagnosed automatically without requiring engine disassembly or additional pressure sensors.

FIG. 1 depicts a hybrid propulsion system 100 for a vehicle. In the depicted embodiment, the vehicle is a hybrid electric vehicle (HEV). Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 166.

Engine 10 delivers power to transmission 44 via torque input shaft 18. In the depicted example, transmission 44 is a power-split transmission (or transaxle) that includes a planetary gearset 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 32, as further elaborated below.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 50 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

Figure 3:
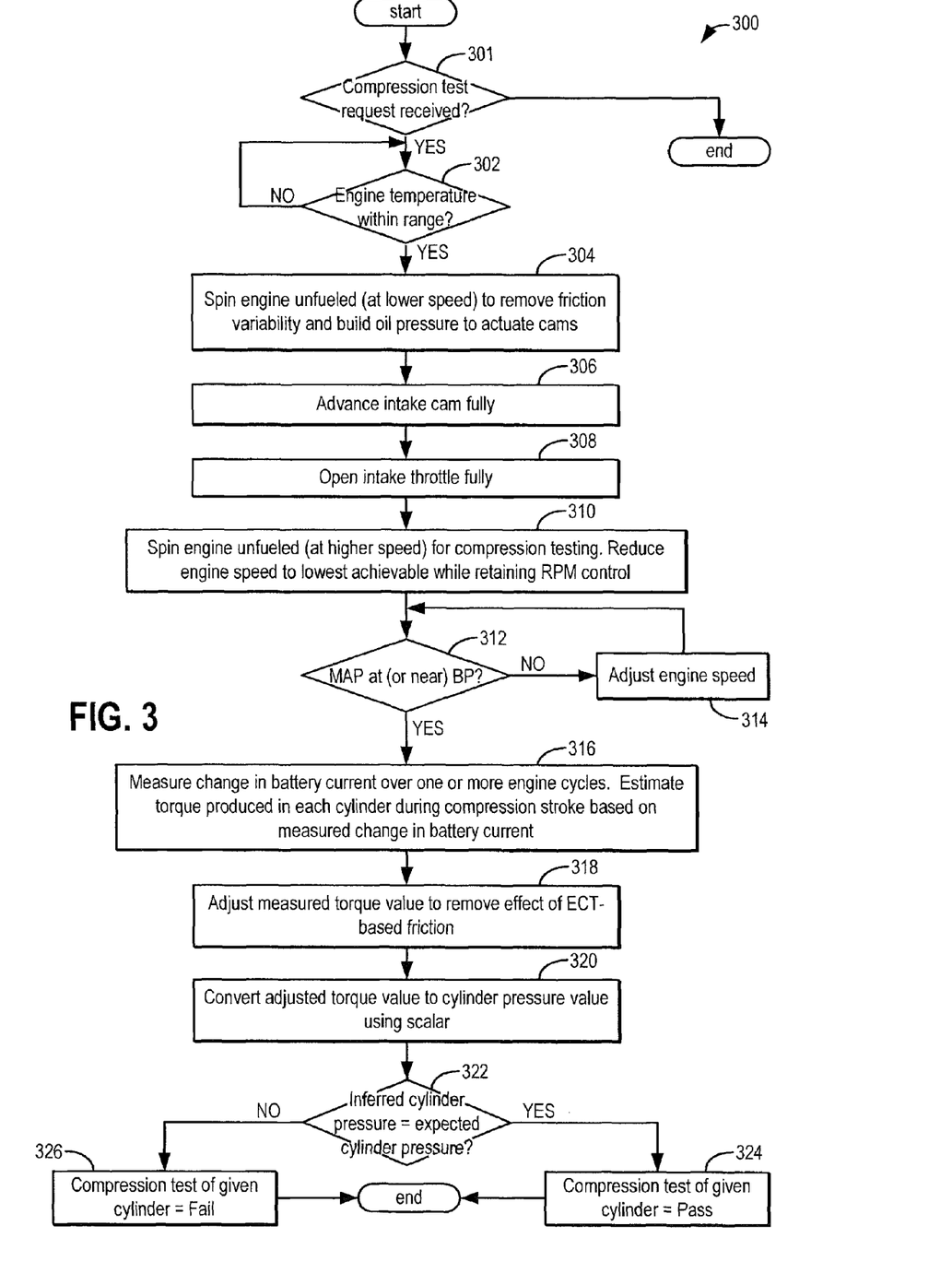
FIG. 3 depicts a high level flow chart for performing a non-intrusive engine compression test.
Figure 4:
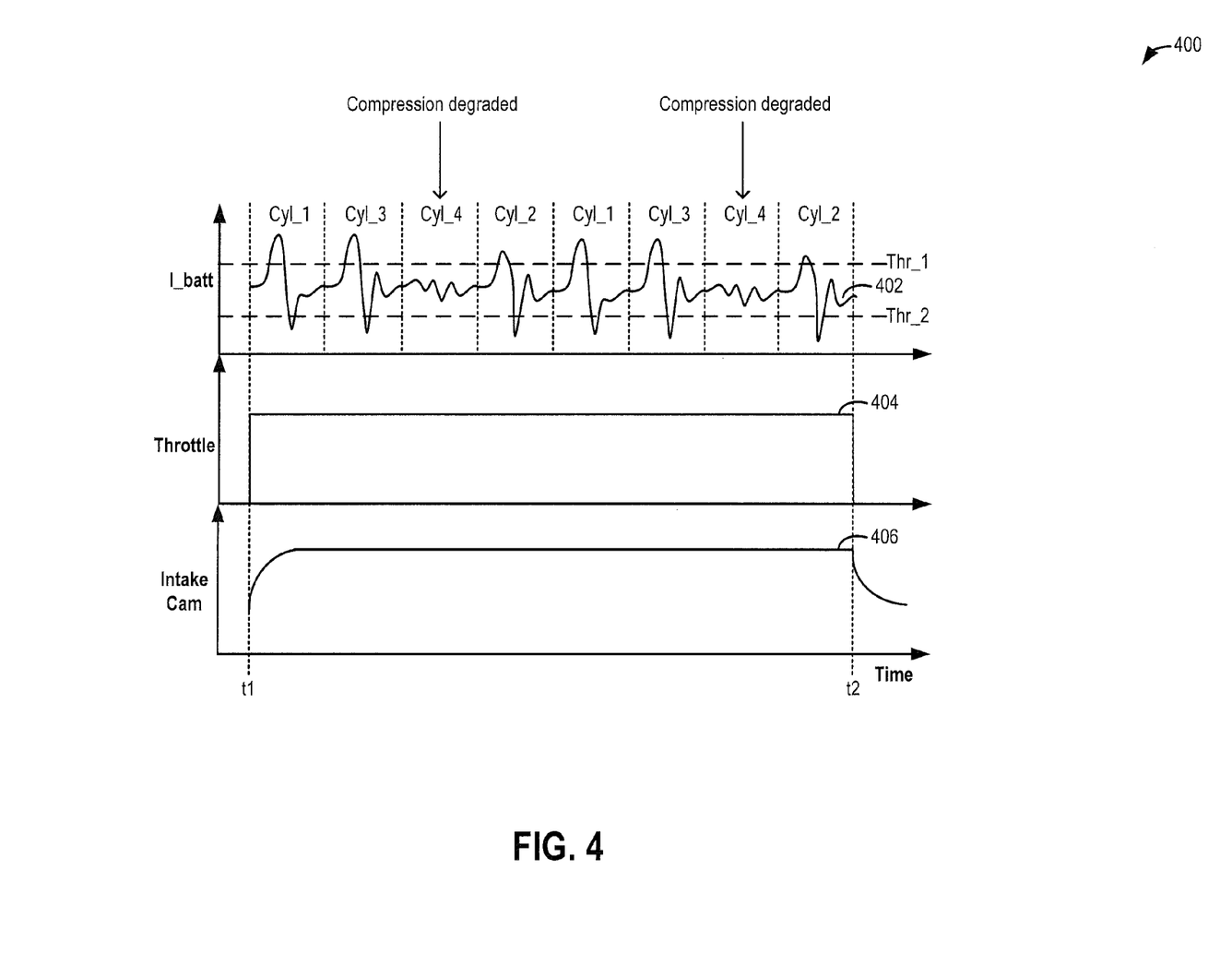
FIG. 4 depicts an example compression test, according to the present disclosure

As elaborated herein with reference to FIG. 3, during selected conditions, motor 26 and/or generator 24 may be used to spin engine 10 unfueled. In particular, during conditions when propulsion system 100 is not being operated, in response to a request for engine compression testing, battery power may be used to operate the motor/generator to spin the engine unfueled. By monitoring a change in the current of battery 54 during the spinning of the engine, over multiple engine cycles, cylinder compression parameters such as cylinder compression torque and pressure values, may be inferred. During the spinning, an intake cam may be fully advanced and an intake throttle may be fully opened to increase the airflow to the cylinders, thereby allowing higher peak cylinder pressures to be achieved. As such, this improves the signal to noise ratio of data collected from the cylinders and allows for more reliable diagnostics. Based on deviations of the estimated cylinder compression parameters from expected values, compression degradation in one or more engine cylinders may be identified. This allows the motor torque to be used for non-intrusive compression testing.

The vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 52 (the generator may also be providing torque to wheels if in motoring mode). During the "engine" mode, fuel may be supplied to engine 10 from a fuel tank via fuel injector 166 so that the engine can spin fueled to provide the torque for propelling the vehicle. Specifically, engine power is delivered to the ring gear of the planetary gearset. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Optionally, the engine can be operated to output more torque than is needed for propulsion, in which case the additional power is absorbed by the generator (in generating mode) to charge the battery 54 or supply electrical power for other vehicle loads.

The vehicle may also be driven in an "assist" mode wherein engine 10 is operated and used as the primary source of torque for powering wheels 52 and the electric motor is used as an additional torque source to act in cooperation with, and supplement the torque provided by, engine 10. During the "assist" mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, during braking, low speeds, while stopped at traffic lights, etc. Specifically, motor power is delivered to gear element 70, which in turn drives the gear elements on countershaft 17, and thereon drives wheels 52.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Controller 12 may receive input data from the various sensors, process the input data, and trigger the actuators in response to the processed input data based on instruction or code programmed therein corresponding to one or more routines. An example control routine is described herein with regard to FIG. 3.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input may be received from the vehicle operator regarding a desired mode of downhill travel based on a position of button 58, as previously discussed with reference to FIG. 1. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Specifically, the generator 24 and driveline including motor 26 are coupled to the crankshaft and provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

As elaborated with reference to FIG. 3, during conditions when a compression level of cylinder 30 is being diagnosed, intake cam 151 may be fully advanced so as to fully advance the timing of intake valve 150. At the same time, throttle 20 may be fully opened. In doing so, air flow to the cylinder is maximized, allowing for elevated cylinder peak pressures. This improves the signal to noise ratio during a compression test of the cylinder and provides more accurate and reliable compression test results.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold pressure signal (MAP) from sensor 124, cylinder AFR from EGO sensor 128, and abnormal combustion from a knock sensor. Engine speed signal, RPM, may be generated by controller 12 from signal PIP.

Storage medium read-only memory 110 can be programmed with computer readable data representing instructions executable by processor 106 for performing the methods described below as well as other variants that are anticipated but not specifically listed.

As such, adequate compression levels are required within each cylinder in order for engine 10 to operate properly. Accordingly, an engine compression test may be intermittently performed by a service technician to diagnose the compression level in each cylinder. Inadequate cylinder compression may be used to diagnose degradation of various cylinder components such as valves, gaskets, rings, etc. The inventors herein have recognized that when a compression test is requested, the engine may be spun unfueled using power from the vehicle system motor or generator while the intake valve is advanced and the intake throttle is fully opened. A battery current may then be monitored. Since the battery has internal resistance, the voltage across the battery terminals varies as a function of engine spinning resistance, which varies according to the compression in each cylinder. Thus, a monitored change in battery current during the unfueled spinning of the engine can be used to estimate the torque and pressure produced in each cylinder's compression stroke. If a cylinder does not produce sufficient pressure or torque, compression degradation may be indicated. This allows compression diagnosis to be performed non-intrusively and substantially automatically. In addition, a time and labor required by a technician is reduced. Based on the cylinder pressure profile inferred from the change in battery current, a nature of the compression degradation may be determined. Also, the service technician may disassemble the degraded cylinder to identify the cause of compression degradation.

Now turning to FIG. 3, an example routine 300 is described for performing a non-intrusive compression test according to the present disclosure. By spinning an engine unfueled using motor torque while increasing airflow to the cylinders by opening the throttle and advancing the intake cams, changes in a battery current can be used to infer cylinder compression parameters with improved signal to noise ratio.

At 301, it may be confirmed that a request for compression testing has been received at the vehicle. In one example, the request for compression testing may be received by the vehicle from a service technician while the vehicle is in a key-off condition (e.g., parked in a garage). The service technician may request the test using a simple diagnostic tool that attaches on to the vehicle (e.g., a location on the body of the vehicle). Alternatively, the request may be received via a touch-interactive display on the vehicle's dashboard.

Upon confirming the request, at 302, it may be confirmed that selected engine conditions are met. Specifically, it may be confirmed that the engine temperature is within a defined range. For example, it may be confirmed that the engine temperature is above a threshold (e.g., 60° F.). As such, the compression test spinning may be only performed when the engine temperature is within the limit and after a request for compression testing has been received at the vehicle, and while the vehicle is not operating.

Upon confirming engine conditions, the compression test may be automatically initiated (that is, without further inputs from a vehicle operator or the service technician). At 304, the routine includes spinning the engine unfueled using motor torque from a battery-driven electric motor (or generator) of the vehicle system. The spinning may be performed with the intake valve timing advanced and intake throttle open, as discussed at 306-308. Specifically, torque from the electric motor/generator of the vehicle may be used to spin the engine at a first, higher engine speed (e.g., 1000 rpm) for a first, shorter duration (e.g., 15 seconds). This initial spin is used to reduce or remove friction variability in compression resulting from a lack of oil film and to build enough oil pressure at an engine-driven oil pump to help actuate the intake cam.

At 306, the intake valve timing may be fully advanced by fully advancing the intake cam. At 308, the intake throttle may be fully opened. By spinning the engine with the intake valve fully advanced and the intake throttle fully open, more air may be ingested in the cylinder allowing a larger peak pressure to be generated in the cylinder. As such, this improves the signal to noise ratio of the cylinder. At 310, the engine spinning includes spinning the engine at a second, lower speed (e.g., 1000 rpm to as low as 200 rpm) for a second, longer duration (e.g., 30 seconds). The second engine speed may be lower than the first engine speed, and may include an engine speed reduced to be the lowest achievable engine speed that retains sufficient engine speed control. In one example, the first speed and the first duration may be based on the pressure of the mechanical oil pump coupled to the engine and the intake cam while the second speed and second duration are based on manifold pressure relative to BP. For example, the second speed and/or duration may be adjusted to bring MAP at or near BP. Specifically, at 312, it may be confirmed that MAP is at or near BP. If not, at 314, the engine speed may be adjusted to bring MAP closer to BP.

Spinning the engine at the second speed may also include spinning the engine at an engine speed based on battery state of charge (battery SOC), the speed increased as the battery SOC increases. However, if the battery SOC falls below a threshold, the compression test may be aborted and the engine may be spun fueled to recharge the battery SOC and avoid vehicle incapacitation.

At 316-324, the routine includes indicating cylinder compression degradation based on a change in battery current during the spinning. Specifically, at 316, the routine includes estimating a cylinder compression stroke torque based on a change in vehicle battery current. Herein, a compression stroke torque for each engine cylinder is estimated based on changes in the battery current while the intake manifold pressure is substantially at or around BP. At 318, the estimated cylinder compression torque is adjusted to remove friction effects (specifically, the effect of engine coolant temperature (ECT)-based friction) on torque estimation. For example, the estimated cylinder compression torque may be modified using a factor that is based on ECT and engine speed. The controller may use a 3D table based on ECT and engine speed to adjust the estimated cylinder compression torque. Further refinement to the compression torque estimation may be performed using information from the MAP and BP values to infer any pumping losses. Finally, altitude effects of BP may be taken into account in the compression threshold.

At 320, the routine includes converting the modified compression stroke torque for each cylinder to an inferred compression stroke pressure for the respective cylinders using a scalar algorithm. As such, a scalar algorithm may be used since torque is proportional to pressure. In this way, a compression pressure for each engine cylinder may be inferred based on the estimated cylinder compression stroke torque. As such, a further advantage of this method over relative compression tests is that it provides an absolute pressure measurement, which allows for detection of poor compression even if all cylinders are affected equally.

At 322, the inferred compression pressure for each cylinder may be compared to an expected compression stroke pressure and cylinder compression degradation may be indicated based on the inferred cylinder compression pressure relative to the expected cylinder compression pressure. The expected compression pressure for each cylinder may be stored in a look-up table in the controller's memory and may be based on one or more of engine coolant temperature, engine speed, BP and MAP. Specifically, at 322, it may be determined if the inferred cylinder compression pressure is at or around the expected cylinder compression pressure. If the inferred cylinder compression pressure does not deviate from the expected cylinder compression pressure, at 324, it may be determined that the cylinder compression levels are satisfactory and a flag indicating that the engine has passed the compression test may be set.

If the inferred cylinder compression pressure does deviate from the expected cylinder compression pressure, for example, if the inferred cylinder compression pressure is lower than the expected cylinder compression pressure by more than a threshold amount, then at 326, it may be determined that the compression level in one or more identified engine cylinders is not satisfactory and a flag indicating that the corresponding cylinders have not passed the compression test may be set.

In some embodiments, the compression test may be performed at multiple engine speeds. For example, the engine may be spun unfueled and battery current may be initially monitored at a first, lower engine speed. Then, the engine may be spun unfueled and battery current may be monitored at a second, higher engine speed. By performing the test at different engine speeds, the reliability of the results is improved. By using the electric motor to spin the engine, rather than using the starter motor to spin the battery, a wider range of engine speeds are available. In addition, since the starter motor torque runs off of a 12v battery which does not have its current precisely monitored, torque prediction algorithms using the motor/generator and HEV battery current may be more mature and accurate, and readily available in a power-split controller.

It will be appreciated that in addition to determining cylinder degradation, in some embodiments, based on the trend in change in cylinder compression pressure (or trend in change in cylinder compression torque or trend in change in battery current), a nature of the degradation may be determined. For example, in response to a slow rise in compression pressure, it may be determined that the piston rings are leaking. In another example, in response to compression pressure rising slowly and not reaching a target level, valve leak may be identified.

Now turning to FIG. 4, an example compression test is shown. Map 400 of FIG. 4 depicts battery current (I_batt) of a vehicle system battery coupled to an electric motor/generator at plot 402, intake throttle opening at plot 404, and intake cam timing at plot 406. The plots are depicted over time, wherein time is shown as engine cycles. In the present example, the engine may be an in-line 4 cylinder engine wherein each engine cycle is defined by the firing of each of Cylinders 1-4 in the depicted firing order (Cyl_1 then Cyl_3 then Cyl_4 and then Cyl_2). The depicted example shows the results from 2 engine cycles.

Prior to t1 the engine may be shut down and the hybrid vehicle may not be operating. During this time, the intake throttle may be closed (plot 404) and the intake cam may be set at a nominal position. At t1, a request from compression testing is received. In response to the request, the engine is spun unfueled using motor torque and changes in a battery current (plot 402) are observed. The engine is spun while fully opening the intake throttle and fully advancing the intake cam to maximize the amount of air ingested in the cylinders.

As shown at plot 402, the battery current (and correspondingly the cylinder compression pressure) may gradually rise, then drop, and then return towards the initial value over the strokes of each combustion event. In the depicted example, the change in battery current during the firing of Cyl_4 during each of the two engine cycles may be lower than expected. Specifically, the battery current for Cyl_4 may change to be lower than an upper threshold Thr_1 and higher than a lower threshold Thr_2. In comparison, the battery current for all the other cylinders may change to be higher than upper threshold Thr_1 and lower than lower threshold Thr_2. In response to the change in battery current during the firing of Cyl_4 being smaller than expected, it may be determined that the compression of Cyl_4 is degraded and a diagnostic code for the same may be set. At t2, the compression test may be completed and the throttle and intake cam may be returned to their original positions. In this way, cylinder compression can be identified with reduced time and complexity.

In one example, a hybrid vehicle system comprises an engine including a cylinder, electric motor/generator coupled to a battery, an intake cam coupled to an intake valve, an intake throttled coupled to an intake manifold of the engine and a vehicle controller. The controller may be configured with computer readable instructions for, in response to an operator request for a compression test, spinning the engine unfueled using the motor while fully advancing the intake cam and fully opening the intake throttle, monitoring a change in battery current during a compression stroke of the cylinder, estimating each of a cylinder compression torque and a cylinder compression pressure based on the monitored change, and indicating cylinder compression degradation based on the estimated cylinder compression pressure deviating from an expected cylinder compression pressure. Herein, spinning the engine includes spinning the engine at an engine speed based on battery SOC, the speed and length of test can be increased as SOC increases.

In this way, a non-intrusive cylinder compression test can be performed that reduces the amount of time, labor and complexity required by a technician for test completion. In particular, the test may be run substantially automatically following a test request by the technician. By not requiring engine disassembly, damage to cylinder components such as spark plugs threads is reduced. By inferring the cylinder pressure based on the change in battery current, the need for dedicated cylinder pressure transducers is reduced. This provides cost and component reduction benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle comprising:
spinning an engine unfueled using motor torque with intake valve timing advanced and an intake throttle open;
based on a change in battery current during the spinning, indicating cylinder compression degradation; and
wherein the spinning is only performed when engine temperature is within a limit and a request has been received by the vehicle for compression testing.

2. The method of claim 1, wherein the request for compression testing is received by the vehicle from a service technician while the vehicle is in a key-off condition.

3. The method of claim 1, wherein spinning with intake valve timing advanced includes spinning with intake valve timing fully advanced.

4. The method of claim 3, wherein spinning with intake valve timing fully advanced includes spinning with an intake cam fully advanced.

5. The method of claim 1, wherein spinning with intake throttle open includes spinning with the intake throttle fully open.

6. The method of claim 1, wherein spinning the engine unfueled using motor torque includes using torque from an electric motor/generator of the vehicle to spin the engine at a first, higher speed for a first, shorter duration and then spin the engine at a second, lower speed for a second, longer duration.

7. The method of claim 6, wherein the first speed and the first duration are based on pressure of a mechanical oil pump coupled to the engine and an intake cam, and wherein the second speed and second duration are based on manifold pressure relative to barometric pressure.

8. The method of claim 1, wherein indicating cylinder compression degradation based on a change in starter motor current during the spinning includes, estimating a cylinder compression stroke torque based on the change in vehicle battery current;
inferring a cylinder compression pressure based on the estimated cylinder compression stroke torque; and
indicating cylinder compression degradation based on the inferred cylinder compression pressure relative to an expected cylinder compression pressure.

9. The method of claim 8, wherein the expected cylinder compression pressure is based on one or more of engine coolant temperature, engine speed, BP and MAP.

10. A method for a hybrid vehicle, comprising,
in response to a request for compression testing,
spinning an engine unfueled using torque from a battery-driven motor with an intake valve timing advanced and an intake throttle open; and
indicating degradation of cylinder compression responsive to variations in cylinder compression pressure inferred from changes in battery current during the spinning;
wherein the indicating includes,
estimating a compression stroke torque for each engine cylinder based on the changes in battery current including when intake manifold pressure is substantially at or around barometric pressure;
inferring a compression pressure for each engine cylinder based on the estimated cylinder compression stroke torque; and
indicating compression degradation based on the inferred cylinder compression pressure of a cylinder being lower than an expected cylinder compression pressure for the cylinder.

11. The method of claim 10, wherein spinning the engine unfueled includes spinning the engine unfueled while the vehicle is not operating.

12. The method of claim 11, wherein spinning the engine unfueled further includes spinning only when engine temperature is higher than a first threshold.

13. The method of claim 12, wherein spinning with the intake valve timing advanced includes spinning with an intake cam fully advanced, and wherein spinning with the intake throttle open includes spinning with an intake throttle fully open.

14. The method of claim 10, wherein inferring the compression pressure for each engine cylinder based on the estimated cylinder compression stroke torque includes:
modifying the estimated compression stroke torque using a factor based on engine coolant temperature and engine speed to remove friction effects on torque estimation; and
converting the modified compression stroke torque to an inferred compression pressure using a scalar algorithm.

15. The method of claim 14, wherein the expected cylinder compression pressure for the cylinder is based on one or more of engine speed, engine temperature, MAP and BP.

16. A hybrid vehicle system, comprising:
an engine including a cylinder;
an electric motor/generator coupled to a battery;
an intake cam coupled to an intake valve;
an intake throttle coupled to an intake manifold of the engine; and
a controller with computer readable instructions for,
in response to an operator request for a compression test,
spinning the engine unfueled using the electric motor/generator while fully advancing the intake cam and fully opening the intake throttle, wherein spinning the engine includes spinning the engine at an engine speed based on a battery state of charge, the speed increased as the state of charge increases;
monitoring a change in battery current during a compression stroke of the cylinder;
estimating each of a cylinder compression torque and a cylinder compression pressure based on the monitored change; and
indicating cylinder compression degradation based on the estimated cylinder compression pressure deviating from an expected cylinder compression pressure.

* * * * *